(12) United States Patent
Ju et al.

(10) Patent No.: US 9,204,310 B2
(45) Date of Patent: Dec. 1, 2015

(54) METHOD AND DEVICE FOR CONVERTING MOBILE ALLOCATION

(71) Applicant: Huawei Technologies Co., Ltd., Shenzhen (CN)

(72) Inventors: Zhiqiang Ju, Shanghai (CN); Dongyu Chu, Bonn (DE); Liwen Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 13/790,464

(22) Filed: Mar. 8, 2013

(65) Prior Publication Data

US 2013/0183997 A1     Jul. 18, 2013

Related U.S. Application Data

(63) Continuation of application No. PCT/CN2011/078566, filed on Aug. 18, 2011.

(30) Foreign Application Priority Data

Sep. 9, 2010    (CN) .......................... 2010 1 0280290

(51) Int. Cl.
     *H04W 16/14*      (2009.01)
     *H04W 36/06*      (2009.01)

(52) U.S. Cl.
     CPC .............. *H04W 16/14* (2013.01); *H04W 36/06* (2013.01)

(58) Field of Classification Search
     CPC .............................. H04W 16/14; H04W 36/06
     USPC ........................................................ 455/454
     See application file for complete search history.

(56) References Cited

U.S. PATENT DOCUMENTS

| 2002/0015416 A1 | 2/2002 | Lee et al. | |
|---|---|---|---|
| 2003/0112784 A1* | 6/2003 | Lohtia et al. | 370/342 |
| 2004/0032853 A1* | 2/2004 | D'Amico et al. | 370/349 |

(Continued)

FOREIGN PATENT DOCUMENTS

| CN | 101425822 A | 5/2009 |
|---|---|---|
| CN | 101500250 A | 8/2009 |

(Continued)

OTHER PUBLICATIONS

Office Action issued in corresponding Chinese Patent Application No. 201010280290.1, mailed Jun. 4, 2012.

(Continued)

*Primary Examiner* — Qun Shen
(74) *Attorney, Agent, or Firm* — Brinks Gilson & Lione

(57) ABSTRACT

Embodiments of the present invention provide a method for converting mobile allocation and an upper control node of a base station. The method for converting mobile allocation includes: determining that at least one cell in cells controlled by an upper control node of a base station requires mobile allocation (MA) conversion; and instructing a base station to which the at least one cell belongs to convert, according to a time slot cluster, an MA occupied by a time slot of the at least one cell, where the time slot cluster is formed by the same time slots on different carrier frequencies. The embodiments of the invention may implement dynamic MA conversion according to actual conditions of a network, thereby guaranteeing the performance of the network, and improving the calling experience of users.

8 Claims, 9 Drawing Sheets

(56) References Cited

U.S. PATENT DOCUMENTS

| | | | |
|---|---|---|---|
| 2004/0228317 A1* | 11/2004 | Tolli et al. ............... | 370/345 |
| 2006/0133308 A1 | 6/2006 | Madan | |
| 2006/0246906 A1 | 11/2006 | Vaittinen et al. | |
| 2007/0191018 A1 | 8/2007 | Terry | |
| 2008/0076432 A1* | 3/2008 | Senarath ............ | H04W 36/24 455/442 |
| 2008/0160986 A1 | 7/2008 | Oh et al. | |
| 2008/0298299 A1* | 12/2008 | Thesling ............ | H04B 7/08582 370/316 |
| 2009/0060081 A1* | 3/2009 | Zhang ............... | H04W 72/0453 375/267 |
| 2009/0279587 A1* | 11/2009 | Eriksson et al. ............. | 375/133 |
| 2009/0285195 A1* | 11/2009 | Chen ................. | H04W 72/048 370/344 |
| 2010/0120359 A1* | 5/2010 | Agarwal ............ | H04B 7/18539 455/12.1 |
| 2010/0272059 A1* | 10/2010 | Bienas ............... | H04W 36/385 370/330 |
| 2011/0002314 A1* | 1/2011 | Choi ................. | H04W 72/0453 370/338 |
| 2011/0077015 A1 | 3/2011 | Saily et al. | |
| 2011/0134809 A1* | 6/2011 | Yu et al. ......................... | 370/277 |
| 2011/0190003 A1* | 8/2011 | Hiltunen et al. .......... | 455/452.1 |
| 2012/0322488 A1* | 12/2012 | Johansson ............ | H04W 16/10 455/513 |

FOREIGN PATENT DOCUMENTS

| | | |
|---|---|---|
| CN | 101635928 A | 1/2010 |
| CN | 101653019 A | 2/2010 |
| CN | 101800573 A | 8/2010 |
| CN | 101938750 A | 1/2011 |
| EP | 1796410 A1 | 6/2007 |
| EP | 2395674 A1 | 12/2011 |
| WO | WO 00/62572 A1 | 10/2000 |
| WO | WO 01/89235 A2 | 11/2001 |

OTHER PUBLICATIONS

Office Action issued in corresponding Chinese Patent Application No. 201010280290.1, mailed Nov. 30, 2012.
International Search Report issued in corresponding PCT Patent Application No. PCT/CN2011/078566, mailed Nov. 24, 2011.
Written Opinion of the International Searching Authority issued in corresponding PCT Patent Application No. PCT/CN2011/078566, mailed Nov. 24, 2011.
Chinese Pat. No. 101938750, issued on Apr. 2, 2014, granted in corresponding Chinese Patent Application No. 201010280290.1, 1 page.
Office Action issued in corresponding Chinese Patent Application No. 201010280290.1, mailed Apr. 23, 2013, 11 pages.

* cited by examiner

METHOD AND DEVICE FOR CONVERTING MOBILE ALLOCATION

CROSS-REFERENCE TO RELATED APPLICATIONS

This application is a continuation of International Application No. PCT/CN2011/078566, filed on Aug. 18, 2011, which claims priority to Chinese Patent Application No. 201010280290.1, filed on Sep. 9, 2010, both of which are hereby incorporated by reference in their entireties.

FIELD OF THE INVENTION

The present invention relates to the field of wireless communications technologies, and in particular, to a method and system for converting mobile allocation, and an upper control node of a base station.

BACKGROUND OF THE INVENTION

Global System for Mobile Communication (Global System for Mobile Communication, GSM for short) system is a frequency division and time division system, data of a mobile terminal or a base station is sent at different frequencies according to a certain rule, and a set of different frequencies is a mobile allocation (Mobile Allocation, MA for short).

With the development of wireless technologies, various network systems emerge, for example, Universal Mobile Telecommunications System (Universal Mobile Telecommunications System, UMTS for short) and Long Time Evolution (Long Time Evolution, LTE for short), and spectrum resources seem to be severely straining. In order to solve the problem, the spectrum resources need to be converted between different network systems, for example, GSM, UMTS, and LTE, so that the different network systems share the spectrum resources.

In the prior art, when the GSM shares the spectrum resources with other network systems, the existing frequency planning solution at the GSM side adopts a double MA manner, that is, spectrum resources in a certain bandwidth (marked as: MA_all) are divided into two types: one type is a base spectrum dedicated for the GSM. Frequencies included in the base spectrum are the same as frequencies included in a base MA, so the base spectrum may be marked as: MA_base. The other type is a share spectrum shared by the GSM and other network systems. Frequencies included in the share spectrum are the same as frequencies included in a share MA, so the shared spectrum may be marked as: MA_share. Before the spectrum sharing, the GSM adopts the double MA manner, and when the spectrum sharing is required to be performed, the GSM shares the MA_share with other network systems.

However, when the double MA manner is adopted, before the spectrum sharing, a frequency hopping set is divided into two: the MA_base and the MA_share, and a mobile station can only hop on the MA_base or the MA_share. By comparing with the hopping on the MA_all, the number of frequencies for hopping is reduced. Therefore, by adopting the double MA manner, the frequency hopping gain of the GSM network before spectrum sharing is reduced, thereby affecting the calling experience of users. It can be understood that, similar problems may exist in communication systems related to MA.

SUMMARY OF THE INVENTION

Embodiments of the present invention provides a method for converting mobile allocation and an upper control node of a base station, so as to implement dynamic conversion of spectrum resources, guarantee the performance of a network, and improve the calling experience of users.

On one hand, a method for converting mobile allocation is provided, which includes:

determining that at least one cell in cells controlled by an upper control node of a base station requires mobile allocation (MA) conversion; and instructing a base station to which the at least one cell belongs to convert, according to a time slot cluster, an MA occupied by a time slot of the at least one cell, where the time slot cluster is formed by the same time slots on different carrier frequencies.

On the other hand, a method for converting mobile allocation is further provided, which includes:

receiving a message sent by an upper control node of a base station, where the message includes information for instructing to perform mobile allocation (MA) conversion; and converting an MA occupied by a time slot of at least one cell in a base station according a time slot cluster on the basis of the message, where the time slot cluster is formed by the same time slots on different carrier frequencies.

On one hand, an upper control node of a base station is provided, which includes:

a determining module, configured to determine that at least one cell in cells controlled by an upper control node of a base station requires mobile allocation (MA) conversion; and an instructing module, configured to instruct a base station to which the at least one cell belongs to convert, according to a time slot cluster, an MA occupied by a time slot of the at least one cell, where the time slot cluster is formed by the same time slots on different carrier frequencies.

On one hand, a base station is provided, which includes:

a receiving module, configured to receive a message sent by an upper control node of a base station, where the message includes information for instructing to perform mobile allocation (MA) conversion; and a converting module, configured to convert, according to a time slot cluster on the basis of the message, an MA occupied by a time slot of at least one cell in the base station, where the time slot cluster is formed by the same time slots on different carrier frequencies.

On the other hand, a system for converting mobile allocation is provided, which includes the upper control node of a base station and the base station.

Through embodiments of the present invention, when the upper control node of the base station determines that at least one cell in the cells controlled by the upper control node of the base station requires MA conversion, the upper control node of the base station instructs the base station to which the at least one cell belongs to convert the MA occupied by the time slot of the at least one cell according to the time slot cluster, thereby implementing that the MA conversion is performed dynamically, guaranteeing the performance of a network, and improving the calling experience of users.

DETAILED DESCRIPTION OF THE EMBODIMENTS

In order to make the objectives, technical solutions, and advantages of the present invention clearer, the technical solutions of the present invention are described in further detail below with reference to embodiments and the accompanying drawings.

Figure 1:
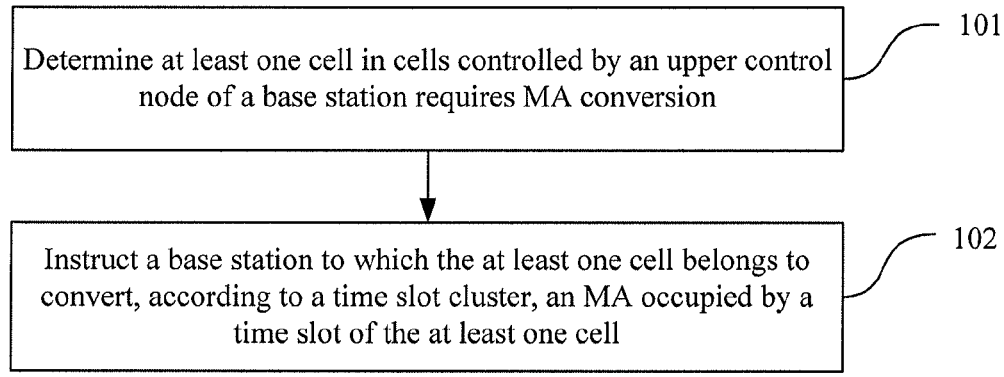
FIG. 1 is a flow chart of an embodiment of a method for converting mobile allocation of the present invention.

FIG. 1 is a flow chart of an embodiment of a method for converting mobile allocation of the present invention. As shown in FIG. 1, the method for converting mobile allocation may include the following content.

Step 101: Determine that at least one cell in cells controlled by an upper control node of a base station requires MA conversion.

Step 102: Instruct a base station to which the at least one cell belongs to convert, according to a time slot cluster, an MA occupied by a time slot of the at least one cell.

In this embodiment, the performing conversion on the MA is that, after receiving an instruction of the upper control node of the base station, the base station to which the at least one cell belongs reconfigures an MA occupied by a time slot of the at least one cell, for example, configures an MA occupied by a time slot occupying a share carrier frequency in the at least one cell to a share MA, and configures an MA occupied by a time slot occupying a non-share carrier frequency in the at least one cell to a base MA. The share carrier frequency is a carrier frequency that needs to be turned off after spectrum sharing, and the non-share carrier frequency is a carrier frequency that does not need to be turned off after the spectrum sharing. In this embodiment of the present invention, the share carrier frequency and the non-share carrier frequency may be determined according to parameter configurations, for example: a frequency planning manner and a specification of a power amplifier. By taking baseband frequency hopping as an example, if a certain carrier frequency occupies a frequency in a share spectrum, the carrier frequency is a share carrier frequency. The MA conversion success refers to that the reconfiguration performed by the base station to the time slot is successful.

Figure 2:
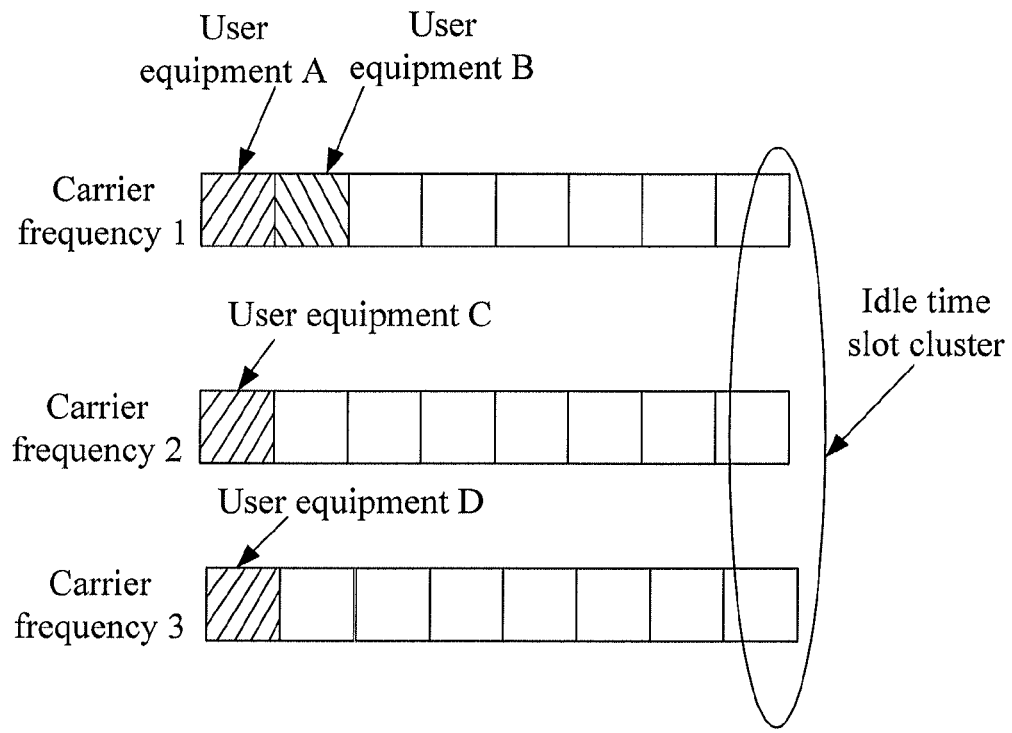
FIG. 2 is a schematic diagram of an embodiment of time slot clusters of the present invention.

In this embodiment, the same time slots on different carrier frequencies may be referred to a time slot cluster, that is to say, the time slot cluster is formed by the same time slots on different carrier frequencies. FIG. 2 is a schematic diagram of an embodiment of time slot clusters of the present invention. As shown in FIG. 2, for example, in a GSM system, one carrier frequency has 8 time slots, and therefore, totally 8 time slot clusters exist. In FIG. 2, it is assumed that three carrier frequencies (a carrier frequency 1, a carrier frequency 2, and a carrier frequency 3) exist.

In an implementation manner of this embodiment, the determining that the at least one cell in the cells controlled by the upper control node of the base station requires the MA conversion may be: determining that a load of the at least one cell is smaller than or equal to a first load threshold; or, determining that loads of all cells under a base station to which the at least one cell belongs are smaller than or equal to a first load threshold. The first load threshold may be set randomly according to the performance of a network and/or requirements of quality of service, which is not limited in this embodiment.

The instructing the base station to which the at least one cell belongs to convert the MA occupied by the time slot of the at least one cell according to the time slot cluster may be: instructing the base station to which the at least one cell belongs to convert, according to the time slot cluster, an MA occupied by a time slot occupying a share carrier frequency in the at least one cell to a share MA, and an MA occupied by a time slot occupying a non-share carrier frequency in the at least one cell to a base MA.

Specifically, first, the upper control node of the base station may instruct the base station to convert an MA occupied by a time slot occupying a share carrier frequency in the idle time slot cluster of the at least one cell to the share MA, and convert an MA occupied by a time slot occupying a non-share carrier frequency in the idle time slot cluster to the base MA. An idle time slot cluster is a time slot cluster in which all time slots are not occupied by user equipments. In FIG. 2, time slots that are not occupied by user equipments are represented by blank blocks, and if none of time slots of one time slot cluster is occupied by a user equipment, it indicates that the time slot cluster is an idle time slot cluster, as shown in FIG. 2.

After the base station performs the MA conversion on the idle time slot clusters successfully, the upper control node of the base station may determine whether a time slot cluster on which the MA conversion is not performed exists in the time slot clusters of the at least one cell.

If the time slots of the at least one cell are all idle time slots, the MA conversion of all the time slots has been completed after the conversion as described above, that is to say, the time slot cluster on which the MA conversion is not performed does not exist in the time slot clusters of the at least one cell, and the base station may be instructed to deactivate the share carrier frequency.

If not all the time slots of the at least one cell are idle time slots, after the conversion as described above, a time slot cluster on which the MA conversion is not performed still exists in the time slot clusters of the at least one cell, and therefore, a user equipment on the time slot cluster, to be converted, of the at least one cell is instructed to be switched to an idle time slot of another time slot cluster, and the base station is instructed to convert the MA occupied by the time slot occupying the share carrier frequency in a time slot cluster that is to be converted to a share MA, and to convert the MA occupied by the time slot occupying the non-share carrier frequency in the time slot cluster that is to be converted to a base MA, until MAs occupied by time slots in all the time slot clusters of the at least one cell are converted successfully. If all the time slot clusters of the at least one cell are converted successfully, the base station may be instructed to deactivate the share carrier frequency.

The instructing the user equipment on the time slot cluster, to be converted, of the at least one cell to be switched to the idle time slot of another time slot cluster may be: if the number of the user equipments on the time slot clusters that are to be converted is smaller than or equal to the number of idle time slots occupying the base MA, instructing a user equipment on a time slot cluster, to be converted, to be switched to an idle time slot occupying the base MA; or, if the number of the user equipments on the time slot clusters to be converted is greater than the number of idle time slots occupying the base MA, selecting time slot clusters of the first predetermined number from the time slot clusters that are to be converted, and instructing a user equipment on the time slot clusters of the first predetermined number to be switched to an idle time slot of another time slot cluster.

It should be noted that, when the user equipment on the time slot cluster, to be converted, of the at least one cell is instructed to be switched to the idle time slot of another time slot cluster, a user equipment on a time slot cluster to be converted may be instructed to be randomly switched to an idle time slot of another time slot cluster randomly, or user equipments on time slot clusters to be converted may be instructed to be switched to idle time slots of other time slot clusters according to a certain order (for example, according to precedence of the idle time slots of the other time slot clusters).

Preferably, before the user equipment on the time slot cluster, to be converted, of the at least one cell is instructed to be switched to the idle time slot of another time slot cluster, the upper control node of the base station may further start from a time slot cluster that has the lowest channel occupation, and select, according to the order of channel occupations from low to high, time slot clusters of the predetermined number from the time slot clusters that are to be converted; starts a timer, and in a period timed by the timer, waits for user equipments on the selected time slot clusters of the predetermined number to be released automatically.

In this way, the instructing the user equipment on the time slot cluster, to be converted, of the at least one cell to be switched to the idle time slot of another time slot cluster may be: after the timer expires, instructing unreleased user equipments on the selected time slot clusters of the predetermined number to be switched to the idle time slots of other time slot clusters according to the order of the precedence of the idle time slots of the other time slot clusters from high to low. In this embodiment, the idle time slots of other time slot clusters may have different precedence according to different consideration factors, for example, the order of the precedence from high to low is: an idle time slot occupying the base MA, an idle time slot occupying a non-share carrier frequency in a time slot cluster that is to be converted, and an idle time slot occupying a share carrier frequency in the time slot cluster that is to be converted.

Moreover, in the foregoing implementation, if a user equipment accesses the base station during the MA conversion, the upper control node of the base station may allocate, according to the order of precedence of the time slots from high to low, a time slot for the user equipment that newly accesses the base station during the MA conversion. In this embodiment, the time slots may have different precedence according to different consideration factors, for example, the order of the precedence from high to low may be: a time slot occupying the base MA, a time slot occupying a non-share carrier frequency in a time slot cluster that is to be converted, and a time slot occupying a share carrier frequency in the time slot cluster that is to be converted.

In another implementation manner of this embodiment, the determining that the at least one cell in the cells controlled by the upper control node of the base station requires the MA conversion may be: determining that a load of the at least one cell is greater than a second load threshold; or, determining that loads of all cells under the base station to which the at least one cell belongs are greater than a second load threshold. The second load threshold may be set randomly according to the performance of the network and/or requirements of quality of service, which is not limited in this embodiment.

The instructing the base station to which the at least one cell belongs to convert the MA occupied by the time slot of the at least one cell according to the time slot cluster may be: instructing the base station to which the at least one cell belongs to convert, according to the time slot cluster, a share MA occupied by a time slot occupying a share carrier frequency in the at least one cell, and a base MA occupied by a time slot occupying a non-share carrier frequency in the at least one cell, where the converted share MA and the converted base MA constitute one MA.

Specifically, first, the upper control node of the base station may instruct the base station to which the at least one cell belongs to activate the share carrier frequency occupied by the time slot cluster of the at least one cell according to the time slot cluster; then, the upper control node of the base station selects time slot clusters of the second predetermined number from the time slot clusters of the at least one cell, and instructs a user equipment on the selected time slot clusters of the second predetermined number to be switched to an idle time slot of unselected time slot cluster.

Finally, the upper control node of the base station instructs the base station to convert the share MA occupied by the time slot occupying the share carrier frequency in the idle time slot cluster of the selected time slot clusters of the second predetermined number, and convert the base MA occupied by the time slot occupying the non-share carrier frequency in the idle time slot cluster of the selected time slot clusters of the second predetermined number, where the converted share MA and the converted base MA constitute one MA.

After the base station performs the MA conversion on the idle time slot cluster of the selected time slot clusters of the second predetermined number successfully, the upper control node of the base station may determine whether a time slot cluster on which the MA conversion is not performed exists in the time slot clusters of the at least one cell; if the time slot cluster on which the MA conversion is not performed exists in the time slot clusters of the at least one cell, the upper control node of the base station repeats the steps of selecting time slot clusters of the second predetermined number from the time slot clusters of the at least one cell, instructing a user equipment on the selected time slot clusters of the second predetermined number to be switched to an idle time slot of an unselected time slot cluster, and instructing the base station to convert the share MA occupied by the time slot occupying the share carrier frequency in the idle time slot cluster of the selected time slot clusters of the second predetermined number, and convert the base MA occupied by the time slot occupying the non-share carrier frequency in the idle time slot cluster of the selected time slot clusters of the second predetermined number, where the converted share MA and the converted base MA constitute one MA, until all MAs occupied by the time slots in all the time slot clusters of the at least one cell are converted successfully.

The selecting the time slot clusters of the second predetermined number from the time slot clusters of the at least one cell may be: starting from a time slot cluster that has the lowest channel occupation, and selecting the time slot clusters of the second predetermined number from the time slot clusters of the at least one cell according to the order of channel occupations from low to high. At this time, the instructing the user equipment on the selected time slot clusters of the second predetermined number to be switched to the idle time slot of the unselected time slot cluster may be:

if the number of user equipments on the selected time slot clusters of the second predetermined number is smaller than or equal to the number of the idle time slots of the unselected time slot clusters, instructing a user equipment on the selected time slot clusters of the second predetermined number to be switched to an idle time slot of an unselected time slot cluster; or, if the number of user equipments on the selected time slot clusters of the second predetermined number is greater than the number of the idle time slots of the unselected time slot clusters, selecting time slot clusters of the third number from the selected time slot clusters of the second predetermined number, and instructing a user equipment on the time slot clusters of the third number to be switched to an idle time slot of an unselected time slot cluster, where the number of the user equipments on the time slot clusters of the third number is smaller than or equal to the number of the idle time slots of the unselected time slot clusters.

In the embodiment, when the upper control node of the base station determines that at least one cell in the cells controlled by the upper control node of the base station requires MA conversion, the base station to which the at least one cell belongs is instructed to convert the MA occupied by the time slot of the at least one cell according to the time slot cluster, thereby implementing that the MA conversion is performed dynamically, guaranteeing the performance of the network, and improving the calling experience of users.

The method for converting mobile allocation provided in the embodiment of the present invention is not only applicable to a second generation mobile communications (Second Generation, 2G for short) communication system, and is also applicable to a third generation mobile communications (Third Generation, 3G for short) communication system, and a system such as a Long Term Evolution/Third Generation Partnership Project System Architecture Evolution (Long Term Evolution/System Architecture Evolution, LTE/SAE for short) system. Network elements in different systems have different names, for example, in a GSM system, a base station is a Base Transceiver Station (Base Transceiver Station, BTS for short), and an upper control node of a base station is a Base Station Controller (Base Station Controller, BSC for short); in a WCDMA, a base station is a NodeB, and an upper control node of a base station is a Radio Network Controller (Radio Network Controller, RNC for short); in a CDMA system, a base station is a BTS, and an upper control node of a base station is a BSC; in an Evolved-High Speed Packet Access (Evolved-High Speed Packet Access, E-HSPA for short) system, a base station is an evolved base station (NodeB+), and an upper control node of a base station is a base station network element controller (for example, M2000); and in an LTE system, a base station is an Evolved NodeB (Evolved NodeB, E-NodeB for short), and an upper control node of a base station is a base station network element controller (for example, M2000). The method for converting mobile allocation provided in an embodiment of the present invention is illustrated in detail by taking an implementation process in a GSM system as an example.

Figure 3A:
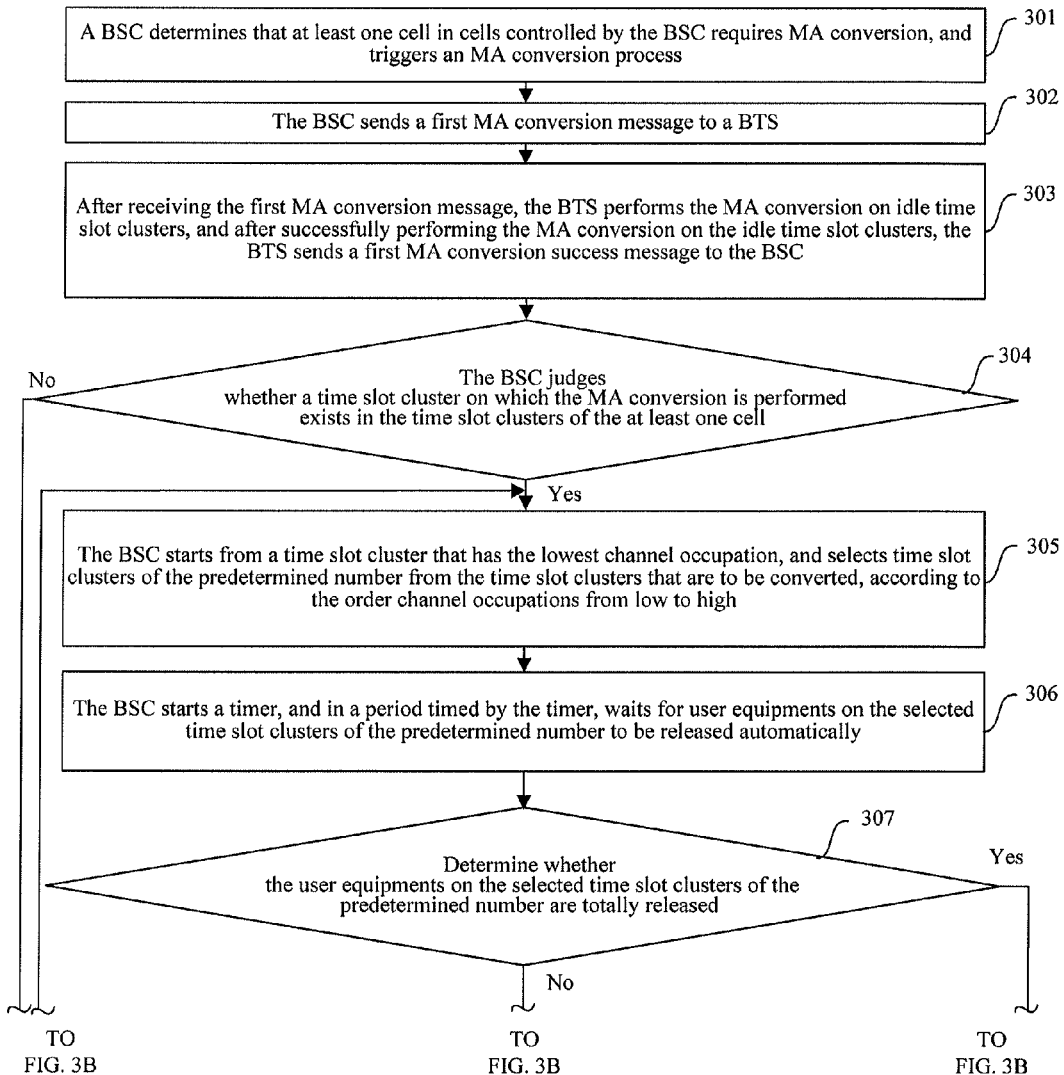
FIGS. 3A and 3B is a flow chart of another embodiment of a method for converting mobile allocation of the present invention.
Figure 3B:
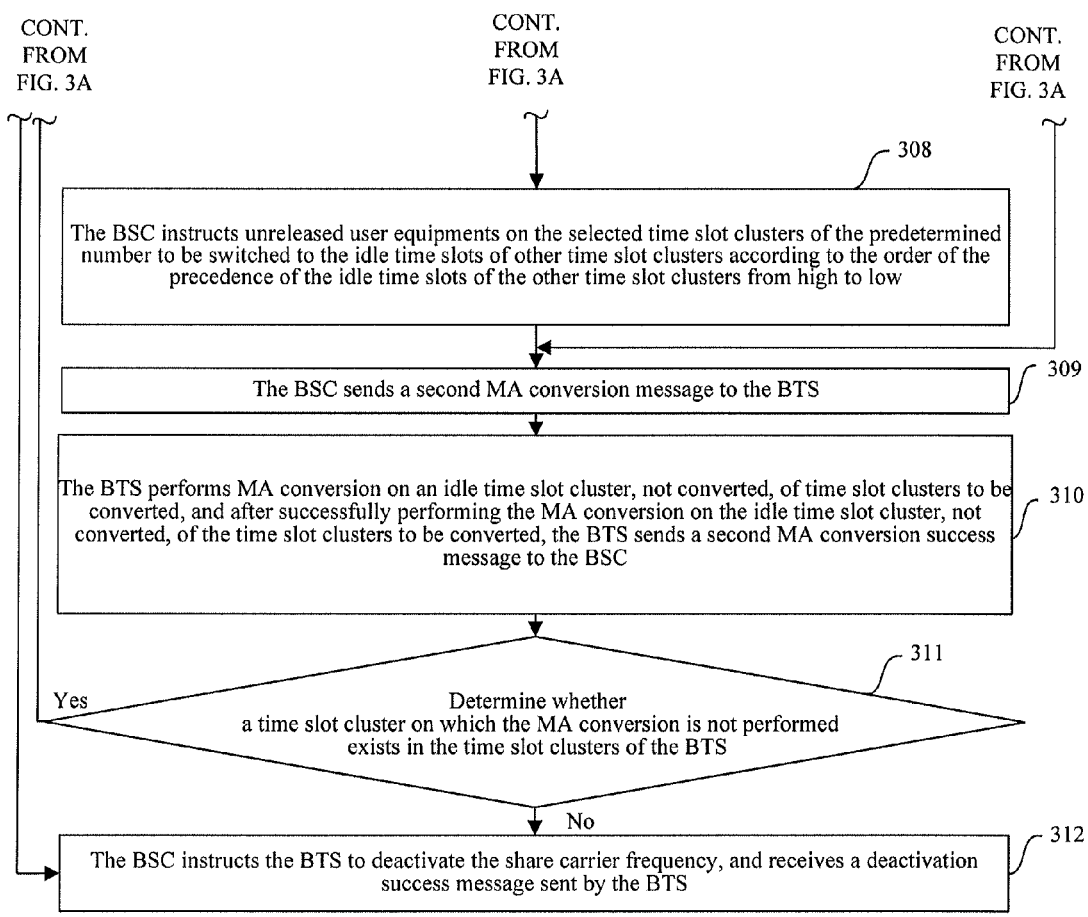

FIG. 3 is a flow chart of another embodiment of a method for converting mobile allocation according to the present invention. As shown in FIG. 3, the method for converting mobile allocation may include the following content.

Step 301: A BSC determines that at least one cell in cells controlled by the BSC requires MA conversion, and triggers an MA conversion process.

Specifically, the BSC determining that at least one cell in the cells controlled by the BSC requires MA conversion may be that: the BSC determines that a load of at least one cell in the cells controlled by the BSC is smaller than or equal to a first load threshold; or, determines that loads of all cells under a base station to which the at least one cell belongs are smaller than or equal to a first load threshold. The first load threshold may be set randomly according to the performance of a network and/or requirements of quality of service, which is not limited in this embodiment. What described are only two situations of determining that the MA conversion is required, and in the embodiment of the present invention, a situation in which the BSC determines that the at least one cell in the cells controlled by the BSC requires the MA conversion is not limited.

Step 302: The BSC sends a first MA conversion message to a BTS, where the first MA conversion message instructs the BTS to convert an MA occupied by a time slot occupying a share carrier frequency in an idle time slot cluster of the at least one cell to a share MA, and convert an MA occupied by a time slot occupying a non-share carrier frequency in an idle time slot cluster of the at least one cell to a base MA.

Step 303: After receiving the first MA conversion message, the BTS performs the MA conversion on the idle time slot cluster, and after performing the MA conversion on the idle time slot cluster successfully, the BTS sends a first MA conversion success message to the BSC.

Step 304: After receiving the first MA conversion success message, the BSC may determine whether a time slot cluster on which the MA conversion is not performed exists in the time slot clusters of the at least one cell, and if the time slot cluster on which the MA conversion is not performed exists in the time slot clusters of the at least one cell, step 305 is performed. If the BSC determines that the time slot cluster on which the MA conversion is not performed does not exist in the time slot clusters of the at least one cell, step 312 is performed.

Step 305: The BSC starts from a time slot cluster that has the lowest channel occupation, and selects time slot clusters of the predetermined number from the time slot clusters that are to be converted, according to the order of channel occupations from low to high.

The channel occupation of a time slot cluster may refer a ratio of the number of the time slots occupied by user equipments in the time slot clusters to the total number of the time slots in the time slot clusters.

By taking the time slot clusters shown in FIG. 2 as an example, channel occupation of time slot clusters where a user equipment A, a user equipment C and a user equipment D are located is 1, and channel occupation of a time slot cluster where a user equipment B is located is $\frac{1}{3}$.

In this embodiment, the predetermined number may be set as a random numeral as required, for example, 2 or 4, and the value of the predetermined number is not limited in this embodiment.

Step 306: The BSC starts a timer, and in a period timed by the timer, waits for user equipments on the selected time slot clusters of the predetermined number to be released automatically.

The time length of the timer is a prepared time length of spectrum sharing, and may be set randomly according to the actual situation and performance requirements of a GSM network, which is not limited in this embodiment. The waiting for the user equipments on the selected time slot clusters of the predetermined number to be released automatically may be: waiting for the user equipments on the selected time slot clusters of the predetermined number to end services that are being used, for example: waiting for the user equipments on the selected time slot clusters of the predetermined number to end calls.

In addition, during the specific implementation, the BSC may label the selected time slot clusters.

Step 307: Determine whether the user equipments on the selected time slot clusters of the predetermined number are totally released.

In the period timed by the timer, if the user equipments on the selected time slot clusters of the predetermined number are totally released, that is, no user equipment exists on the selected time slot clusters of the predetermined number, step 309 is performed. If a user equipment still exists on the selected time slot clusters of the predetermined number after the timer expires, that is, the user equipments on the selected time slot clusters of the predetermined number are not totally released, step 308 is performed.

Step 308: The BSC instructs unreleased user equipments on the selected time slot clusters of the predetermined number to be switched to the idle time slots of other time slot clusters according to the order of precedence of the idle time slots of the other time slot clusters from high to low, and then step 309 is performed.

In this embodiment, the idle time slots of other time slot clusters may have different precedence according to different consideration factors, for example, the order of the precedence from high to low is: an idle time slot occupying a base MA, an idle time slot occupying a non-share carrier frequency in a time slot cluster that is to be converted, and an idle time slot occupying a share carrier frequency in the time slot cluster that is to be converted.

That is to say, after the timer expires, if a user equipment still exists on the selected time slot clusters of the predetermined number, the BSC may switch the user equipment on the selected time slot clusters of the predetermined number to the idle time slot of another time slot cluster, and the BSC performs the switching according to the order of channel occupations from low to high. Definitely, the embodiment of the present invention is not limited thereto, and the BSC may also switch user equipments on the selected time slot clusters of the predetermined number according to the order of the channel occupations from high to low, or according to other orders, which is not limited in the embodiment of the present invention. At this time, the BTS has completed the performing of the MA conversion on the idle time slot clusters, so the BSC first switches a user equipment to a time slot on the base carrier frequency with converted MA, that is, a time slot occupying the base MA. After the time slots on the base carrier frequency with converted MA are fully occupied, the BSC switches an unswitched user equipment to a time slot which occupies a non-share carrier frequency and on which the MA conversion is not performed, that is, the time slot occupying a non-share carrier frequency in the time slot cluster to be converted. After the time slots which occupy the non-share carrier frequency and on which the MA conversion is not performed are fully occupied, the BSC switches an unswitched user equipment to a time slot which occupies a share carrier frequency and on which the MA conversion is not performed, that is, the time slot occupying a share carrier frequency in the time slot cluster to be converted. After the time slots which occupy the share carrier frequency and on which the MA conversion is not performed are fully occupied, if unswitched user equipments still exist, the unswitched user equipments may be placed in a waiting queue, and repeated operations may be performed on the unswitched user equipments as described in the foregoing.

Step 309: The BSC sends a second MA conversion message to the BTS, where the second MA conversion message instructs the BTS to convert the MA occupied by the time slot occupying the share carrier frequency in the idle time slot cluster of the time slot clusters that are to be converted to a share MA, and to convert the MA occupied by the time slot occupying the non-share carrier frequency in the idle time slot cluster of the time slot clusters that are to be converted to a base MA.

Step 310: After receiving the second MA conversion message, the BTS performs the MA conversion on the idle time slot clusters of the time slot clusters that are to be converted, and after successfully performing the MA conversion on the idle time slot clusters of the time slot clusters that are to be converted, the BTS sends a second MA conversion success message to the BSC.

Step 311: After receiving the second MA conversion success message, the BSC determines whether a time slot cluster on which the MA conversion is not performed exists in the time slot clusters of the BTS, and if the time slot cluster on which the MA conversion is not performed exists in the time slot clusters of the BTS, then returns to perform step 305; if the time slot cluster on which the MA conversion is not performed does not exist in the time slot clusters of the BTS, step 312 is performed.

Step 312: The BSC instructs the BTS to deactivate the share carrier frequency, and receives a deactivation success message sent by the BTS.

In this embodiment, if a user equipment accesses the BTS during the MA conversion, the BSC may allocate, according to the order of precedence of the time slots from high to low, a time slot for the user equipment that newly accesses the base station during the MA conversion. In this embodiment, the time slots may have different precedence according to different consideration factors, for example, the order of the precedence from high to low may be: a time slot occupying the base MA, a time slot occupying a non-share carrier frequency in a time slot cluster that is to be converted, and a time slot occupying a share carrier frequency in the time slot cluster that is to be converted.

Specifically, when the MA conversion is performed, the BSC instructs the BTS to perform the MA conversion on the idle time slot clusters first, and as for the user equipment that accesses the BTS before the performing of the MA conversion on the idle time slot clusters is completed, the BSC first allocates, to the user equipment, the time slots which occupy the non-share carrier frequency and on which the MA conversion is not performed, that is, the time slots occupying the non-share carrier frequency in the time slot clusters that are to be converted. After the allocation of the time slots which occupy the non-share carrier frequency and on which the MA conversion is not performed is completed, the BSC allocates, to the user equipment, the time slots which occupy the share carrier frequency and on which the MA conversion is not performed, that is, the time slots occupying the share carrier frequency in the time slot clusters that are to be converted.

As for the user equipment that accesses the BSC after the performing of the MA conversion on the idle time slot clusters is completed, the BSC first allocates, to the user equipment, the time slots on the base carrier frequency with converted MA, that is, the time slots occupying the base MA. After the allocation of the time slots on the base carrier frequency with converted MA is completed, the BSC allocates, to the user equipment, the time slots which occupy the non-share carrier frequency and on which the MA conversion is not performed, that is, the time slots occupying the non-share carrier frequency in the time slot clusters that are to be converted. After the allocation of the time slots which occupy the non-share carrier frequency and on which the MA conversion is not performed is completed, the BSC allocates, to the user equipment, the time slots which occupy the share carrier frequency and on which the MA conversion is not performed, that is, the time slots occupying the share carrier frequency in the time slot clusters that are to be converted.

In the foregoing embodiment, after the BSC determines that at least one cell in the cells controlled by the BSC requires the MA conversion, the BSC instructs the BTS to convert the MA occupied by the time slot occupying the share carrier frequency in the at least one cell to the share MA, and to convert the MA occupied by the time slot occupying the non-share carrier frequency in the at least one cell to the base MA. In the embodiment of the present invention, according to the actual situation of the network, before the MA conversion is performed, all carrier frequencies work on one MA, and the MA conversion is performed only when the spectrum sharing is required, in which the MA occupied by the time slot occupying the share carrier frequency is converted to the share MA, thereby implementing the spectrum sharing. Therefore, the dynamic MA conversion may be performed, so as to guarantee the performance of the network, and improve the calling experience of users. Further, the frequency hopping gain of the GSM network will not be lost before the spectrum sharing is implemented.

A specific example is used in the following to illustrate the implementation of the embodiment shown in FIG. 3.

Figure 4:
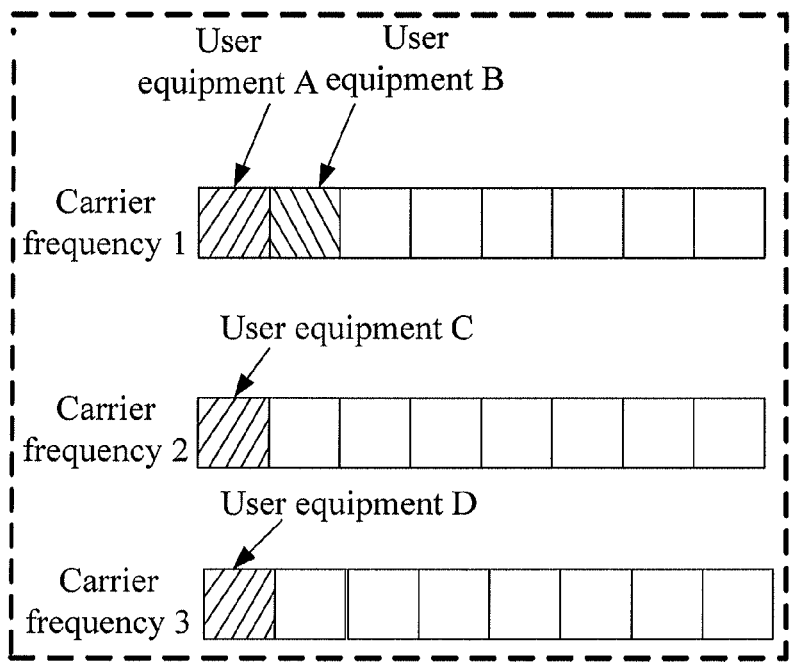
FIG. 4 is a schematic diagram of another embodiment of time slot clusters of the present invention.
Figure 5:
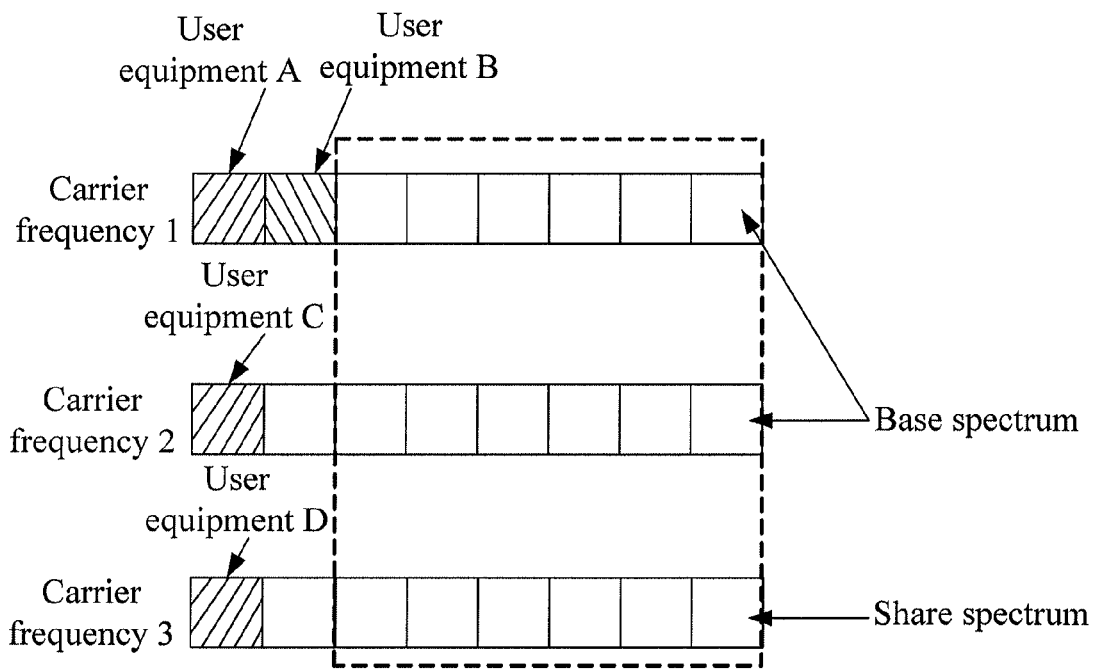
FIG. 5 is a schematic diagram of an embodiment of idle time slot clusters of the present invention after MA conversion is performed.

FIG. 4 is a schematic diagram of another embodiment of time slot clusters of the present invention. As shown in FIG. 4, before MA conversion is performed, all carrier frequencies in one cell controlled by a BSC work on one MA, after the BSC determines that a load of the cell is smaller than or equal to a first load threshold, an MA conversion process is triggered, a first MA conversion message is sent to the BTS, a BTS is instructed to convert an MA occupied by a time slot occupying a share carrier frequency in idle time slot clusters of the cell to a share MA, and to convert an MA occupied by a time slot occupying a non-share carrier frequency in the idle time slot clusters of the cell to a base MA. After receiving the first MA conversion message, the BTS performs MA conversion on the idle time slot clusters, and the idle time slot clusters after the MA conversion are shown by blank blocks in a dashed frame in FIG. 5. FIG. 5 is a schematic diagram of an embodiment of idle time slot clusters of the present invention after MA conversion is performed. In this embodiment, it is assumed that MAs occupied by time slots occupying a carrier frequency 1 and a carrier frequency 2 in idle time slot clusters are converted to base MAs, and an MA occupied by a time slot occupying a carrier frequency 3 in the idle time slot clusters is converted to a share MA.

Figure 6:
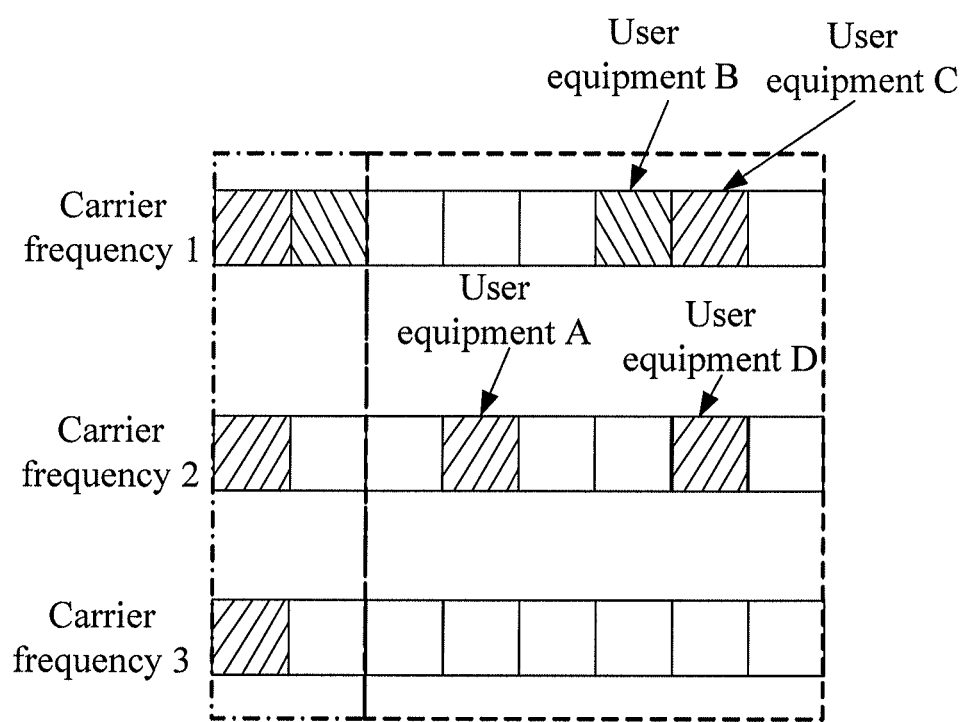
FIG. 6 is a schematic diagram of an embodiment of the present invention after conversion is performed on a user equipment.

Then, the BSC switches, according to the method provided in the embodiment shown in FIG. 3 of the present invention, a user equipment on conversation in a time slot cluster that is to be converted to a time slot on which MA conversion is performed successfully, so that no user equipment exists on the time slot cluster that is to be converted. As shown in FIG. 6. FIG. 6 is a schematic diagram of an embodiment of the present invention after conversion is performed on a user equipment. The BSC sends a second MA conversion message to the BTS, and the second MA conversion message instructs the BTS to convert the MA occupied by the time slot occupying the share carrier frequency in a time slot cluster, to be converted, of the cell to the share MA, and to convert the MA occupied by the time slot occupying the non-share carrier frequency in the time slot cluster, to be converted, of the cell to the base MA. The BTS is then instructed to deactivate the share carrier frequency, so as to share the spectrum occupied by the share carrier frequency with a different system. Time slot clusters to be converted are shown by the blocks in a dash-dotted frame in FIG. 6.

Figure 7:
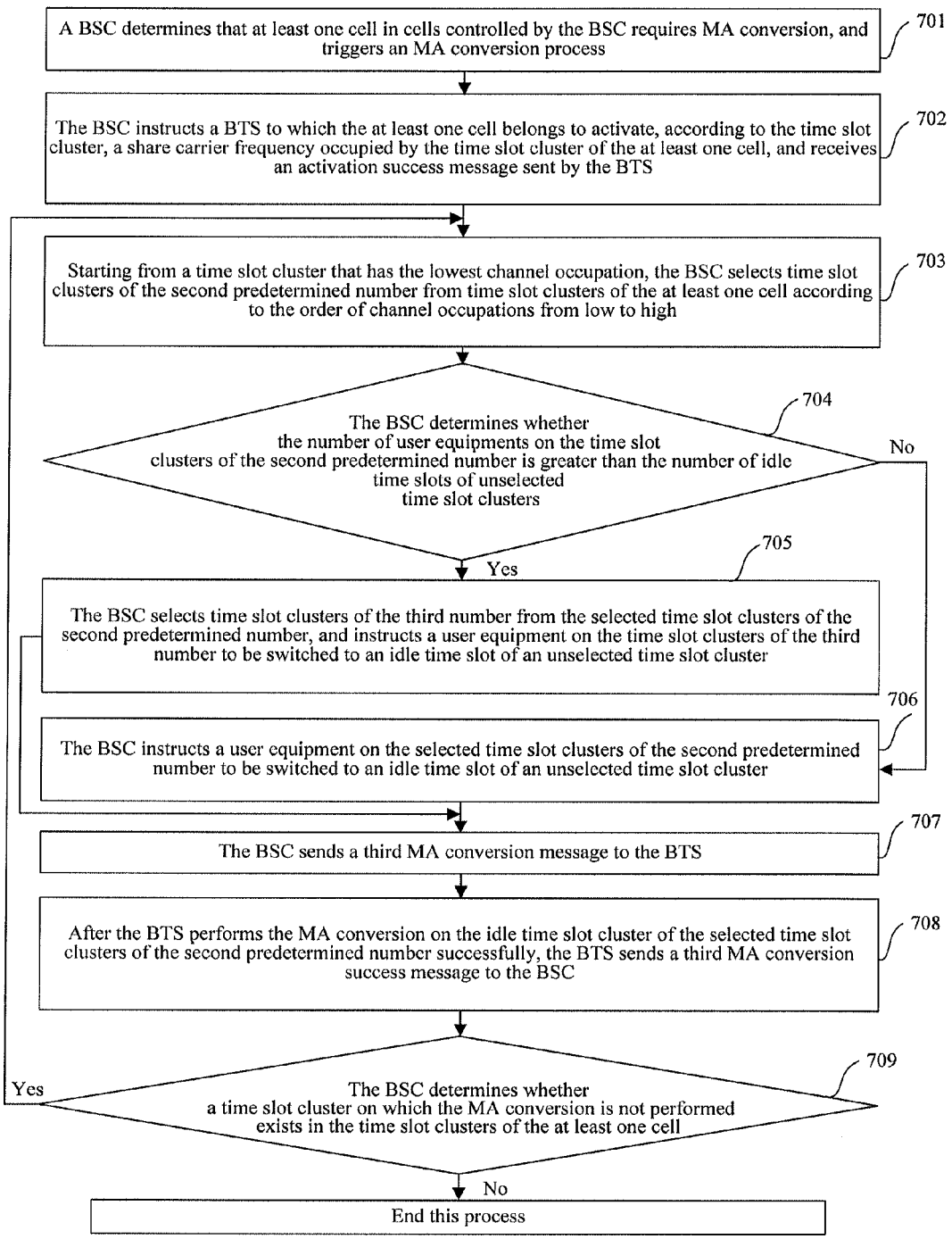
FIG. 7 is a flow chart of still another embodiment of a method for converting mobile allocation of the present invention.

FIG. 7 is a flow chart of still another embodiment of a method for converting mobile allocation according to the present invention. As shown in FIG. 7, the method for converting mobile allocation may include the following content.

Step 701: A BSC determines that at least one cell in cells controlled by the BSC requires MA conversion, and triggers an MA conversion process.

Specifically, the BSC may determine that a load of the at least one cell is greater than a second load threshold; or, determine that loads of all cells under a base station to which the at least one cell belongs are greater than a second load threshold. The second load threshold may be set randomly according to the performance of the network and/or requirements of quality of service, which is not limited in this embodiment. What described are only two situations of determining that the MA conversion is required, and in the embodiment of the present invention, a situation in which the BSC determines that the at least one cell in the cells controlled by the BSC requires the MA conversion is not limited.

Step 702: The BSC instructs a BTS to which the at least one cell belongs to activate, according to a time slot cluster, a share carrier frequency occupied by the time slot cluster of the at least one cell, and receives an activation success message sent by the BTS.

Step 703: Starting from a time slot cluster that has the lowest channel occupation, the BSC selects time slot clusters of the second predetermined number from time slot clusters of the at least one cell according to the order of channel occupations from low to high.

Step 704: The BSC determines whether the number of user equipments on the time slot clusters of the second predetermined number is greater than the number of idle time slots of unselected time slot clusters; if the number of the user equipments on the time slot clusters of the second predetermined number is greater than the number of the idle time slots of the unselected time slot clusters, step 705 is performed; if the number of the user equipments on the time slot clusters of the second predetermined number is smaller than or equal to the number of the idle time slots of the unselected time slot clusters, step 706 is performed.

Step 705: The BSC selects time slot clusters of the third number from the selected time slot clusters of the second predetermined number, and instructs a user equipment on the time slot clusters of the third number to be switched to an idle time slot of an unselected time slot cluster, where the number of the user equipments on the time slot clusters of the third number is smaller than or equal to the number of the idle time slots of the unselected time slot clusters; then, step 707 is performed.

Step 706: The BSC instructs a user equipment on the selected time slot clusters of the second predetermined number to be switched to an idle time slot of an unselected time slot cluster; then, step 707 is performed.

Step 707: The BSC sends a third MA conversion message to the BTS, the third MA conversion message instructs the BTS to convert a share MA occupied by a time slot occupying a share carrier frequency in the idle time slot cluster of the selected time slot clusters of the second predetermined number, and to convert a base MA occupied by a time slot occupying a non-share carrier frequency in the idle time slot cluster of the selected time slot clusters of the second predetermined number, where the converted share MA and the converted base MA constitute one MA.

Step 708: After the BTS performs the MA conversion on the idle time slot cluster of the selected time slot clusters of the second predetermined number successfully, the BTS sends a third MA conversion success message to the BSC.

Step 709: The BSC determines whether a time slot cluster on which the MA conversion is not performed exists in the time slot clusters of the at least one cell; if the time slot cluster on which the MA conversion is not performed exists in the time slot clusters of the at least one cell, returns to perform step 703; if the time slot cluster on which the MA conversion is not performed does not exist in the time slot clusters of the at least one cell, ends this process.

In the foregoing embodiment, after the BSC determines that at least one cell in the cells controlled by the BSC requires the MA conversion, the BSC instructs the base station to which the at least one cell belongs to convert, according to the time slot cluster, the share MA occupied by the time slot occupying the share carrier frequency in the at least one cell and the base MA occupied by the time slot occupying the non-share carrier frequency in the at least one cell, where the converted share MA and the converted base MA constitute one MA. Therefore, dynamic MA conversion may be performed according to actual conditions of a network, thereby guaranteeing the performance of the network, and improving the calling experience of users.

Figure 8:
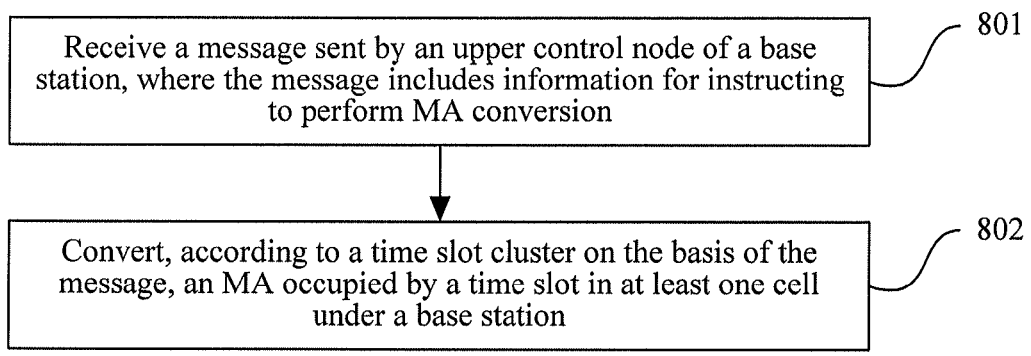
FIG. 8 is a flow chart of yet another embodiment of a method for converting mobile allocation of the present invention.

FIG. 8 is a flow chart of yet another embodiment of a method for converting mobile allocation according to the present invention. As shown in FIG. 8, the method for converting mobile allocation may include the following content.

Step 801: Receive a message sent by an upper control node of a base station, where the message includes information for instructing to perform MA conversion.

Step 802: Convert, according to a time slot cluster on the basis of the message, an MA occupied by a time slot in at least one cell under a base station.

In this embodiment, the converting the MA occupied by the time slot in at least one cell under the base station may be: after receiving the message sent by the upper control node of the base station, the base station reconfigures MAs occupied by time slots of the at least one cell under the base station, for example, configures an MA occupied by a time slot occupying a share carrier frequency in the at least one cell to a share MA, and configures an MA occupied by a time slot occupying a non-share carrier frequency in the at least one cell to a base MA. The share carrier frequency is a carrier frequency that needs to be turned off after spectrum sharing, and the non-share carrier frequency is a carrier frequency that does not need to be turned off after the spectrum sharing. In this embodiment, the share carrier frequency and the non-share carrier frequency may be determined according to parameter configurations, for example: a frequency planning manner and a specification of a power amplifier. By taking baseband frequency hopping as an example, if a certain carrier frequency occupies a frequency in a share spectrum, the carrier frequency is a share carrier frequency. The MA conversion success refers to that the reconfiguration performed by the base station to the time slots is successful.

In this embodiment, the same time slots on different carrier frequencies may be referred to a time slot cluster, that is to say, the time slot cluster is formed by the same time slots on different carrier frequencies, as shown in FIG. 2.

In an implementation manner of this embodiment, the converting the MA occupied by the time slot in at least one cell under the base station according to the time slot cluster on the basis of the message may be: on the basis of the message, converting the MA occupied by the time slot occupying the share carrier frequency in the at least one cell to the share MA, and converting the MA occupied by the time slot occupying the non-share carrier frequency in the at least one cell to the base MA.

Specifically, the base station may convert an MA occupied by a time slot occupying a share carrier frequency in an idle time slot cluster of the at least one cell to a share MA, and convert an MA occupied by a time slot occupying a non-share carrier frequency in the idle time slot cluster to a base MA; where the idle time slot cluster is a time slot cluster in which all time slots are not occupied by user equipments. In FIG. 2, time slots that are not occupied by user equipments are represented by blank blocks, and if all time slots of one time slot cluster are not occupied by user equipments, it indicates that the time slot cluster is an idle time slot cluster, as shown in FIG. 2.

Further, after the MA conversion is performed on the idle time slot cluster successfully, if a time slot cluster on which the MA conversion is not performed exists in time slot clusters of the at least one cell, the base station may continue to convert an MA occupied by a time slot occupying a share carrier frequency in the time slot cluster that is to be converted to a share MA, and convert an MA occupied by a time slot occupying a non-share carrier frequency in the time slot cluster that is to be converted to a base MA, until MAs occupied by time slots in all time slot clusters of the at least one cell are converted successfully.

After the MA conversion is performed on the time slot cluster that is to be converted successfully, the base station may deactivate the share carrier frequency on the basis of an instruction of the upper control node of the base station.

In the foregoing implementation, for specific processes of interaction between the base station and the upper control node of the base station, reference can be made to the description of the embodiment shown in FIG. 3 of the present invention, and details are not repeated herein.

In another implementation manner of this embodiment, the converting the MA occupied by the time slot in at least one cell under the base station according to the time slot cluster on the basis of the message may be: on the basis of the message, converting the share MA occupied by the time slot occupying the share carrier frequency in the at least one cell under the base station and the base MA occupied by the time slot occupying the non-share carrier frequency in the at least one cell, where the converted share MA and the converted base MA constitute one MA.

Specifically, first, the base station may activate, on the basis of the message, a share carrier frequency occupied by the time slot cluster of the at least one cell; then, the base station may convert the share MA occupied by the time slot occupying the share carrier frequency in an idle time slot cluster of time slot clusters of the second predetermined number selected by the upper control node of the base station and the base MA occupied by the time slot occupying the non-share carrier frequency in the idle time slot cluster of the time slot clusters of the second predetermined number selected by the upper control node of the base station, where the converted share MA and the converted base MA constitute one MA.

After the MA conversion is performed successfully on idle time slot clusters of the time slot clusters of the second predetermined number selected by the upper control node of the base station, if a time slot cluster on which the MA conversion is not performed exists in the time slot clusters of the at least one cell, the base station repeats the step of converting the share MA occupied by the time slot occupying the share carrier frequency in the idle time slot cluster of time slot clusters of the second predetermined number selected by the upper control node of the base station, and converting the base MA occupied by the time slot occupying the non-share carrier frequency in the idle time slot cluster of the time slot clusters of the second predetermined number selected by the upper control node of the base station, where the converted share MA and the converted base MA constitute one MA, until MAs occupied by time slots in all time slot clusters of the at least one cell are converted successfully.

For specific processes of conversion and the processes of interaction between the base station and the upper control node of the base station, reference can be made to the description of the embodiment shown in FIG. 7 of the present invention, and details are not repeated herein.

In the foregoing embodiment, after receiving the message that is used to instruct to perform the MA conversion and is sent by the upper control node of the base station, the base station may convert the MA occupied by the time slot of the at least one cell under the base station according to the time slot cluster on the basis of the message. Therefore, dynamic MA conversion may be performed according to actual conditions of a network, thereby guaranteeing the performance of the network, and improving the calling experience of users.

Those of ordinary skill in the art should understand that all or a part of the steps of the method according to the method embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a ROM, a RAM, a magnetic disk, and an optical disk.

Figure 9:
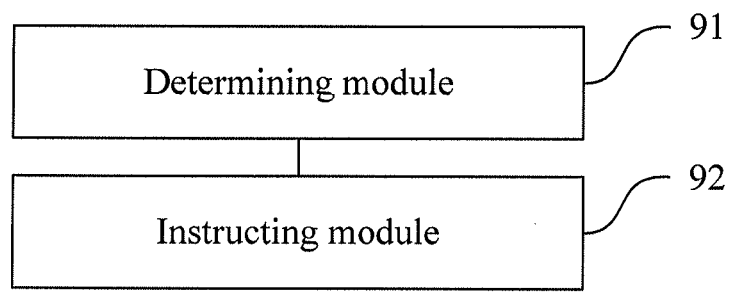
FIG. 9 is a schematic structural diagram of an embodiment of an upper control node of a base station of the present invention.

FIG. 9 is a schematic structural diagram of an embodiment of an upper control node of a base station of the present invention. The upper control node of the base station in this embodiment may implement the process of the embodiment shown in FIG. 1 of the present invention, and as shown in FIG. 9, the upper control node of the base station may include: a determining module 91 and an instructing module 92: where the determining module 91 is configured to determine that at least one cell in cells controlled by an upper control node of a base station requires MA conversion; and the instructing module 92, configured to instruct a base station to which the at least one cell belongs to convert, according to a time slot cluster, an MA occupied by a time slot of the at least one cell. In this embodiment, the time slot cluster is formed by the same time slots on different carrier frequencies.

In the upper control node of the base station, when the determining module 91 determines that at least one cell in the cells controlled by the upper control node of the base station requires MA conversion, the instructing module 92 instructs the base station to which the at least one cell belongs to convert, according to the time slot cluster, the MA occupied by the time slot of the at least one cell, thereby implementing that the MA conversion is performed dynamically, guaranteeing the performance of a network, and improving the calling experience of users.

Figure 10:
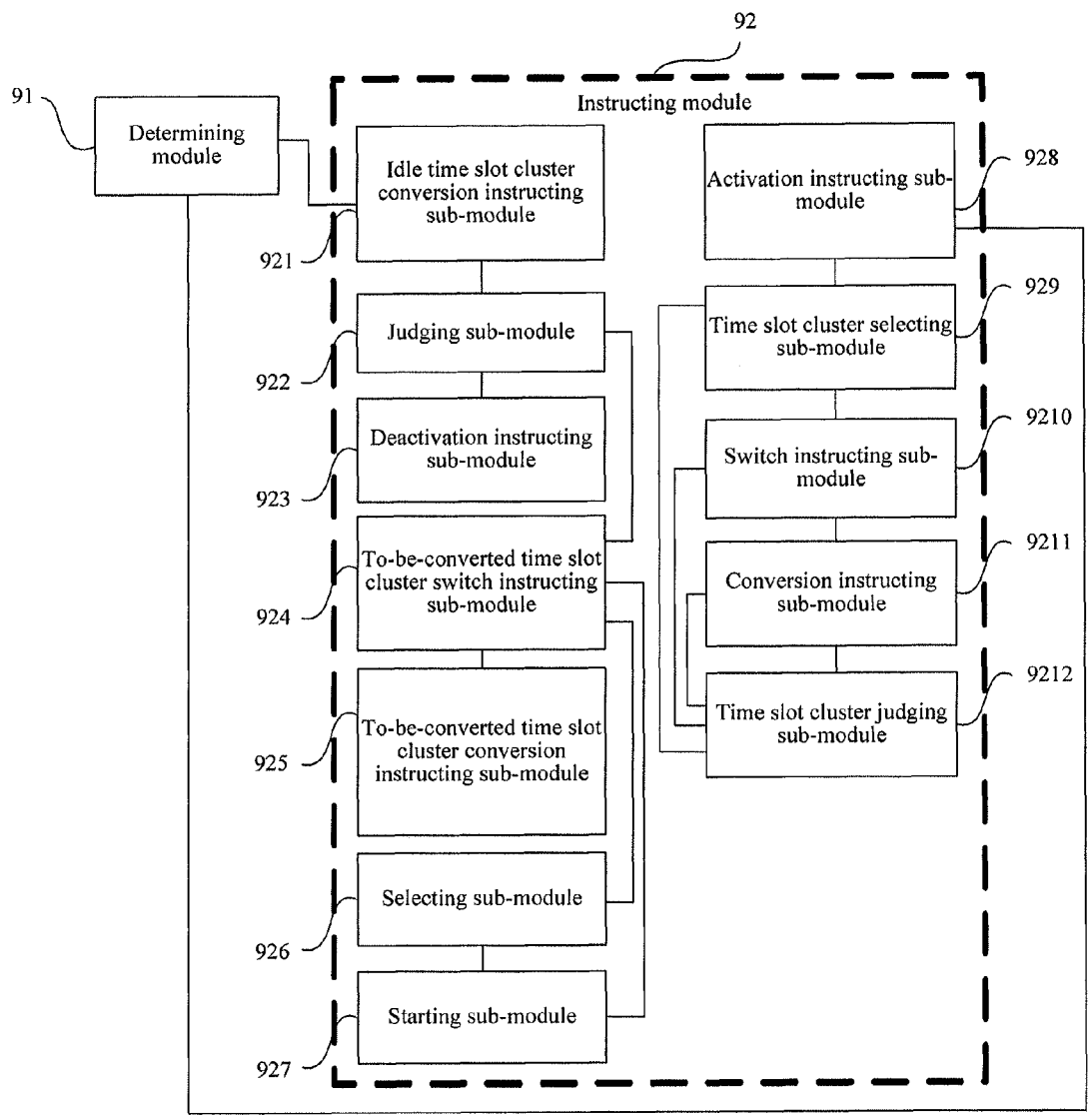
FIG. 10 is a schematic structural diagram of another embodiment of an upper control node of a base station of the present invention.

FIG. 10 is a schematic structural diagram of another embodiment of an upper control node of a base station of the present invention. Compared with the upper control node of the base station shown in FIG. 9, in an implementation manner of the upper control node of the base station shown in FIG. 10, the determining module 91 is specifically configured to determine that a load of the at least one cell is smaller than or equal to a first load threshold; or, determine that loads of all cells under the base station to which the at least one cell belongs are smaller than or equal to a first load threshold. The first load threshold may be set randomly according to the performance of a network and/or requirements of quality of service, which is not limited in this embodiment.

At this time, the instructing module 92 is specifically configured to instruct the base station to which the at least one cell belongs to convert, according to the time slot cluster, an MA occupied by a time slot occupying a share carrier frequency in the at least one cell to a share MA, and an MA occupied by a time slot occupying a non-share carrier frequency in the at least one cell to a base MA.

Specifically, the instructing module 92 may include:

an idle time slot cluster conversion instructing sub-module 921, configured to instruct the base station to convert an MA occupied by a time slot occupying a share carrier frequency in an idle time slot cluster of the at least one cell to a share MA, and convert an MA occupied by a time slot occupying a non-share carrier frequency in the idle time slot cluster to a base MA, where the idle time slot cluster is a time slot cluster in which none of time slots is occupied by a user equipment.

Further, the instructing module 92 may further include:

a judging sub-module 922, configured to, after the base station performs the MA conversion successfully on the idle time slot cluster, determine whether a time slot cluster on which the MA conversion is not performed exists in time slot clusters of the at least one cell; and a deactivation instructing sub-module 923, configured to instruct the base station to deactivate a share carrier frequency after the judging sub-module 922 determines that the time slot cluster on which the MA conversion is not performed does not exist in the time slot clusters of the at least one cell.

Further, the instructing module 92 may further include:

a to-be-converted time slot cluster switch instructing sub-module 924, configured to, after the judging sub-module 922 determines that the time slot cluster on which the MA conversion is not performed does not exist in the time slot clusters of the at least one cell, instruct a user equipment on a time slot cluster, to be converted, of the at least one cell to be switched to an idle time slot of another time slot cluster. Specifically, the to-be-converted time slot cluster switch instructing sub-module 924 is configured to, when the number of user equipments on time slot clusters to be converted is smaller than or equal to the number of idle time slots occupying the base MA, instruct a user equipment on a time slot cluster to be converted to be switched to an idle time slot occupying the base MA; or, the to-be-converted time slot cluster switch instructing sub-module 924 may be configured to, when the number of the user equipments on the time slot clusters to be converted is greater than the number of idle time slots occupying the base MA, select time slot clusters of the first predetermined number from the time slot clusters to be converted, and instruct a user equipment on the time slot clusters of the first predetermined number to be switched to an idle time slot of another time slot cluster.

A to-be-converted time slot cluster conversion instructing sub-module 925, configured to, after the to-be-converted time slot cluster switch instructing sub-module 924 instructs the user equipment on the time slot cluster, to be converted, of the at least one cell to be switched to the idle time slot of another time slot cluster, instruct the base station to convert an MA occupied by a time slot occupying a share carrier frequency in a time slot cluster to be converted to a share MA, and convert an MA occupied by a time slot occupying a non-share carrier frequency in the time slot cluster to be converted to a base MA, until MAs occupied by time slots in all time slot clusters of the at least one cell are converted successfully.

Preferably, the instructing module 92 may further include:

a selecting sub-module 926, configured to, before the to-be-converted time slot cluster switch instructing sub-module 924 instructs the user equipment on the time slot cluster, to be converted, of the at least one cell to be switched to an idle time slot of another time slot cluster, start from a time slot cluster that has the lowest channel occupation, and select time slot clusters of the predetermined number from time slot clusters to be converted, according to the order of channel occupations from low to high; and a starting sub-module 927, configured to start a timer, and in a period timed by the timer, wait for user equipments on the time slot clusters of the predetermined number selected by the selecting sub-module 926 to be released automatically.

At this time, the to-be-converted time slot cluster switch instructing sub-module 924 may specifically be configured to, after the timer expires, instruct unreleased user equipments on the selected time slot clusters of the predetermined number to be switched to idle time slots of other time slot clusters according to the order of the precedence of the idle time slots of the other time slot clusters from high to low. In this embodiment, the idle time slots of other time slot clusters may have different precedence according to different consideration factors, for example, the order of the precedence from high to low is: an idle time slot occupying the base MA, an idle time slot occupying a non-share carrier frequency in a time slot cluster to be converted, and an idle time slot occupying a share carrier frequency in the time slot cluster to be converted.

In another implementation manner of the upper control node of the base station shown in FIG. 10, the determining module 91 is specifically configured to determine that a load of at least one cell is greater than a second load threshold; or, determine that loads of all cells under a base station to which the at least one cell belongs are greater than a second load threshold. The second load threshold may be set randomly according to the performance of a network and/or requirements of quality of service, which is not limited in this embodiment.

The instructing module 92 is specifically configured to instruct the base station to which the at least one cell belongs to convert, according to a time slot cluster, a share MA occupied by a time slot occupying a share carrier frequency in the at least one cell, and a base MA occupied by a time slot occupying a non-share carrier frequency in the at least one cell, where the converted share MA and the converted base MA constitute one MA.

Specifically, the instructing module 92 may include:

an activation instructing sub-module 928, configured to instruct the base station to which the at least one cell belongs to activate a share carrier frequency occupied by a time slot of the at least one cell according to the time slot cluster;

a time slot cluster selecting sub-module 929, configured to select time slot clusters of the second predetermined number from time slot clusters of the at least one cell;

a switch instructing sub-module 9210, configured to instruct a user equipment on the selected time slot clusters of the second predetermined number to be switched to an idle time slot of an unselected time slot cluster; and a conversion instructing sub-module 9211, configured to instruct the base station to convert a share MA occupied by a time slot occupying a share carrier frequency in the idle time slot cluster of the selected time slot clusters of the second predetermined number, and convert a base MA occupied by a time slot occupying a non-share carrier frequency in the idle time slot cluster of the selected time slot clusters of the second predetermined number, where the converted share MA and the converted base MA constitute one MA.

Further, the instructing module 92 may further include:

a time slot cluster judging sub-module 9212, configured to, after the base station performs the MA conversion on the idle time slot cluster of the selected time slot clusters of the second predetermined number successfully, determine whether a time slot cluster on which the MA conversion is not performed exists in the time slot clusters of the at least one cell. If the time slot cluster on which the MA conversion is not performed exists in the time slot clusters of the at least one cell, the steps that the time slot cluster selecting sub-module 929 selects time slot clusters of the second predetermined number from the time slot clusters of the at least one cell, the switch instructing sub-module 9210 instructs a user equipment on the selected time slot clusters of the second predetermined number to be switched to an idle time slot of an unselected time slot cluster, and the conversion instruction sub-module 9211 instructs the base station to convert the share MA occupied by the time slot occupying the share carrier frequency in the idle time slot cluster of the selected time slot clusters of the second predetermined number, and to convert the base MA occupied by the time slot occupying the non-share carrier frequency in the idle time slot cluster of the selected time slot clusters of the second predetermined number, where the converted share MA and the converted base MA constitute one MA are repeated, until all MAs occupied by time slots in all time slot clusters of the at least one cell are converted successfully.

In this embodiment, the time slot cluster judging sub-module 929 is specifically configured to, start from a time slot cluster that has the lowest channel occupation, select the time slot clusters of the second predetermined number from the time slot clusters of the at least one cell, according to the order of channel occupations from low to high. At this time, the switch instructing sub-module 9210 may be specifically configured to, when the number of user equipments on the time slot clusters of the second predetermined number selected by the time slot cluster selecting sub-module 929 is smaller than or equal to the number of idle time slots of unselected time slot clusters, instruct a user equipment on the selected time slot clusters of the second predetermined number to be switched to an idle time slot of an unselected time slot cluster; or, the switch instructing sub-module 9210 is specifically configured to, when the number of user equipments on the time slot clusters of the second predetermined number selected by the time slot cluster selecting sub-module 929 is greater than the number of the idle time slots of the unselected time slot clusters, select time slot clusters of the third number from the selected time slot clusters of the second predetermined number, and instruct a user equipment on the time slot clusters of the third number to be switched to an idle time slot of an unselected time slot cluster, where the number of the user equipments on the time slot clusters of the third number is smaller than or equal to the number of the idle time slots of the unselected time slot clusters.

The upper control node of the base station in this embodiment may include all modules and sub-modules in the foregoing two implementation manners, and may only include the modules and sub-modules in one implementation manner, which is not limited in this embodiment. However, this embodiment is illustrated by taking that the upper control node of the base station includes all modules and sub-modules in the foregoing two implementation manners as an example.

Figure 11:
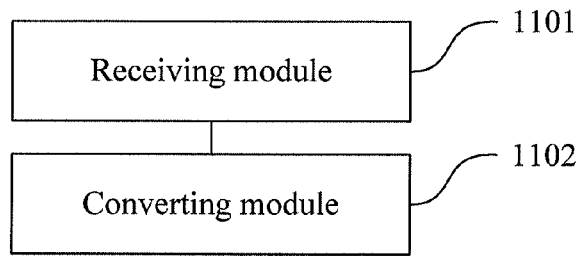
FIG. 11 is a schematic structural diagram of an embodiment of a base station of the present invention.

The upper control node of the base station may implement dynamic MA conversion, thereby guaranteeing the performance of a network, and improving the calling experience of users FIG. 11 is a schematic structural diagram of an embodiment of a base station of the present invention. The base station in this embodiment may implement the processes of the embodiment shown in FIG. 8 of the present invention. As shown in FIG. 11, the base station may include: a receiving module 1101 and a converting module 1102: where the receiving module 1101 is configured to receive a message sent by an upper control node of a base station, where the message includes information for instructing to perform MA conversion; and the converting module 1102 is configured to convert, according to a time slot cluster on the basis of the message, an MA occupied by a time slot of at least one cell under the base station. In this embodiment, the time slot cluster is formed by the same time slots on different carrier frequencies.

In the base station, after the receiving module 1101 receives the message that is used to instruct to perform the MA conversion and is sent by the upper control node of the base station, the converting module 1102 may convert an MA occupied by a time slot of the at least one cell under the base station according to the time slot cluster on the basis of the message. Therefore, dynamic MA conversion may be performed according to actual conditions of a network, thereby guaranteeing the performance of the network, and improving the calling experience of users.

Figure 12:
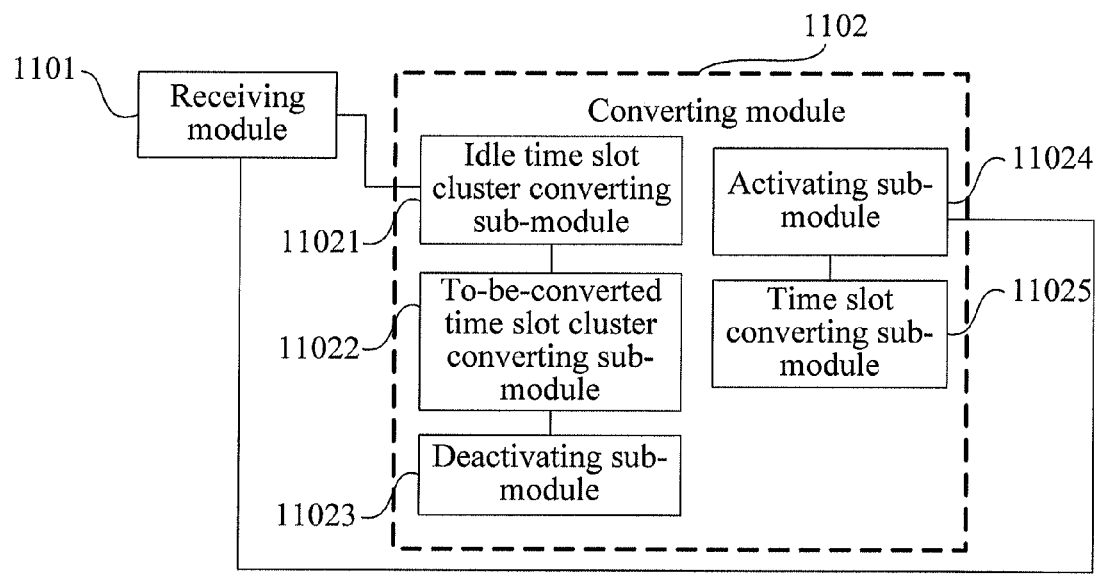
FIG. 12 is a schematic structural diagram of another embodiment of a base station of the present invention.

FIG. 12 is a schematic structural diagram of another embodiment of a base station of the present invention. Compared with the base station shown in FIG. 11, in an implementation manner of the base station shown in FIG. 12, the converting module 1102 may convert, on the basis of the message, an MA occupied by a time slot occupying a share carrier frequency in at least one cell under a base station to a share MA, and an MA occupied by a time slot occupying a non-share carrier frequency in the at least one cell to a base MA.

Specifically, the converting module 1102 may include:

an idle time slot cluster converting sub-module 11021, configured to convert an MA occupied by a time slot occupying a share carrier frequency in an idle time slot cluster of at least one cell to a share MA, and convert an MA occupied by a time slot occupying a non-share carrier frequency in the idle time slot cluster to a base MA, where the idle time slot cluster is a time slot cluster in which none of time slots is occupied by a user equipment.

Further, the converting module 1102 may further include:

a to-be-converted time slot cluster converting sub-module 11022, configured to, after the idle time slot cluster converting sub-module 11021 performs the MA conversion on the idle time slot cluster successfully, if a time slot cluster on which the MA conversion is not performed exists in time slot clusters of the at least one cell, convert an MA occupied by a time slot occupying a share carrier frequency in a time slot cluster to be converted to a share MA, and convert an MA occupied by a time slot occupying a non-share carrier frequency in the time slot to be converted to a base MA, until MAs occupied by time slots in all time slot clusters of the at least one cell are converted successfully.

Further, the converting module 1102 may further include:

a deactivating sub-module 11023, configured to, after the to-be-converted time slot cluster converting sub-module 11022 successfully performs the MA conversion on the time slot cluster to be converted, deactivate the share carrier frequency on the basis of an instruction of the upper control node of the base station.

In the other implementation manner of the base station as shown in FIG. 12, the converting module 1102 may convert, on the basis of the message, a share MA occupied by a time slot occupying a share carrier frequency in the at least one cell under the base station, and a base MA occupied by a time slot occupying a non-share carrier frequency in the at least one cell, where the converted share MA and the converted base MA constitute one MA.

Specifically, the converting module 1102 may include:

an activating sub-module 11024, configured to activate, on the basis of the message, the share carrier frequency occupied by a time slot cluster of the at least one cell; and a time slot converting sub-module 11025, configured to convert the share MA occupied by the time slot occupying the share carrier frequency in an idle time slot cluster of time slot clusters of the second predetermined number selected by the upper control node of the base station, and convert the base MA occupied by the time slot occupying the non-share carrier frequency in the idle time slot cluster of the time slot clusters of the second predetermined number selected by the upper control node of the base station, where the converted share MA and the converted base MA constitute one MA.

After the time slot converting sub-module 11025 successfully performs the MA conversion on the idle time slot cluster of the time slot clusters of the second predetermined number selected by the upper control node of the base station, if a time slot cluster on which the MA conversion is not performed exists in the time slot clusters of the at least one cell, the time slot converting sub-module 11025 repeats the step of converting the share MA occupied by the time slot occupying the share carrier frequency in the idle time slot cluster of time slot clusters of the second predetermined number selected by the upper control node of the base station, and converting the base MA occupied by the time slot occupying the non-share carrier frequency in the idle time slot cluster of the time slot clusters of the second predetermined number selected by the upper control node of the base station, where the converted share MA and the converted base MA constitute one MA, until MAs occupied by time slots in all time slot clusters of the at least one cell are converted successfully.

The base station in this embodiment may include all modules and sub-modules in the foregoing two implementation manners, and may only include the modules and sub-modules in one implementation manner, which is not limited in this embodiment. However, this embodiment is illustrated by taking that the base station includes all modules and sub-modules in the foregoing two implementation manners as an example.

The base station may implement dynamic MA conversion according to actual conditions of a network, thereby guaranteeing the performance of a network, and improving the calling experience of users.

Figure 13:
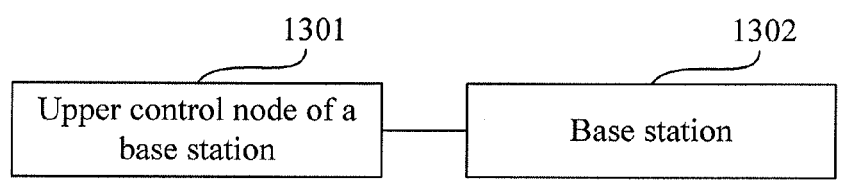
FIG. 13 is a schematic structural diagram of an embodiment of a system for converting mobile allocation of the present invention.

FIG. 13 is a schematic structural diagram of an embodiment of a system for converting mobile allocation of the present invention. As shown in FIG. 13, the system for converting mobile allocation may include an upper control node 1301 of a base station and a base station 1302.

The upper control node 1301 of the base station is configured to determine that at least one cell in cells controlled by the upper control node 1301 of the base station requires MA conversion; instruct the base station 1302 to which the at least one cell belongs to convert, according to a time slot cluster, an MA occupied by a time slot of the at least one cell. In this embodiment, the time slot cluster is formed by the same time slot on different carrier frequencies. Specifically, the upper control node 1301 of the base station may be implemented through the upper control node of the base station in the embodiment of the present invention shown in FIG. 9 or FIG. 10.

The base station 1302 is configured to receive a message sent by the upper control node 1301 of the base station, where the message includes information for instructing to perform the MA conversion; and convert an MA occupied by a time slot of the at least one cell under the base station 1302 according to the time slot cluster on the basis of the message. Specifically, the base station 1302 may be implemented through the base station in the embodiment of the present invention shown in FIG. 11 or FIG. 12.

The system may implement dynamic MA conversion, thereby guaranteeing the performance of a network, and improving the calling experience of users It should be understood by persons skilled in the art that the accompanying drawings are merely schematic views of an exemplary embodiment, and modules or processes in the accompanying drawings are not necessarily required in implementing the present invention.

It should be understood by persons skilled in the art that, modules in a device according to an embodiment may be distributed in the device of the embodiment according to the description of the embodiment, or be correspondingly changed and be disposed in one or more devices different from this embodiment. The modules of the above embodiment may be combined into one module, or further divided into a plurality of sub-modules.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the idea and scope of the present invention.

What is claimed is:

1. A method for converting mobile allocation, comprising:
   determining that at least one cell in cells controlled by an upper control node of a base station requires mobile allocation (MA) conversion, comprising determining that a load of the at least one cell is smaller than or equal to a first load threshold; or, determining that loads of all cells under the base station to which the at least one cell belongs are smaller than or equal to a first load threshold; and
   instructing the base station to which the at least one cell belongs to convert, according to a time slot cluster, an MA occupied by a time slot of the at least one cell, wherein the time slot cluster, which comprises more than one time slot, is formed by same time slots on different carrier frequencies, and the number of the time slot cluster equals to the number of time slots in a carrier frequency, comprising instructing the base station to convert an MA occupied by a time slot occupying a share carrier frequency in an idle time slot cluster of the at least one cell to a share MA, and convert an MA occupied by a time slot occupying a non-share carrier frequency in the idle time slot cluster to a base MA; wherein the idle time slot cluster is a time slot cluster in which none of time slots is occupied by a user equipment.

2. The method according to claim 1, wherein the determining that the at least one cell in the cells controlled by the upper control node of the base station requires the mobile allocation (MA) conversion comprises:
   determining that a load of the at least one cell is greater than a second load threshold; or,
   determining that loads of all cells under the base station to which the at least one cell belongs are greater than a second load threshold; and
   the instructing the base station to which the at least one cell belongs to convert the MA occupied by the time slot of the at least one cell according to the time slot cluster comprises:
   instructing the base station to which the at least one cell belongs to convert, according to the time slot cluster, a share MA occupied by a time slot occupying a share carrier frequency in the at least one cell, and a base MA occupied by a time slot occupying a non-share carrier frequency in the at least one cell, wherein the converted share MA and the converted base MA constitute one MA.

3. The method according to claim 1, further comprising:
   if a user equipment accesses the base station during the MA conversion, allocating a time slot for the user equipment that newly accesses the base station during the MA conversion according to an order of precedence of time slots from high to low, wherein the order of the precedence of the time slots from high to low is: an time slot occupying a base MA, an time slot occupying a non-share carrier frequency in a time slot cluster to be converted, and an time slot occupying a share carrier frequency in the time slot cluster to be converted.

4. The method according to claim 2, wherein the instructing the base station to which the at least one cell belongs to convert, according to the time slot cluster, the share MA occupied by the time slot occupying the share carrier frequency in the at least one cell, and the base MA occupied by the time slot occupying the non-share carrier frequency in the at least one cell, wherein the converted share MA and the converted base MA constitute one MA comprises:
   instructing the base station to which the at least one cell belongs to activate, according to the time slot cluster, the share carrier frequency occupied by the time slot of the at least one cell;
   selecting time slot clusters of a second predetermined number from time slot clusters of the at least one cell;
   instructing a user equipment on the selected time slot clusters of the second predetermined number to be switched to an idle time slot of an unselected time slot cluster; and
   instructing the base station to convert the share MA occupied by the time slot occupying the share carrier frequency in an idle time slot cluster of the selected time slot clusters of the second predetermined number, and convert the base MA occupied by the time slot occupying the non-share carrier frequency in the idle time slot cluster of the selected time slot clusters of the second predetermined number, wherein the converted share MA and the converted base MA constitute one MA.

5. An upper control node of a base station, comprising: a determining module, configured to determine that at least one cell in cells controlled by an upper control node of a base station requires mobile allocation (MA) conversion, wherein the determining module is configured to determine that a load of the at least one cell is smaller than or equal to a first load threshold, or, determine that loads of all cells under the base station to which the at least one cell belongs are smaller than or equal to a first load threshold; and the instructing module is specifically configured to instruct the base station to which the at least one cell belongs to convert, according to the time slot cluster, an MA occupied by a time slot occupying a share carrier frequency in the at least one cell to a share MA, and an MA occupied by a time slot occupying a non-share carrier frequency in the at least one cell to a base MA; and an instructing module, configured to instruct the base station to which the at least one cell belongs to convert, according to a time slot cluster, an MA occupied by a time slot of the at least one cell, wherein the time slot cluster, which comprises more than one time slot, is formed by same time slots on different carrier frequencies, and the number of the time slot cluster equals to the number of time slots in a carrier frequency, wherein the instructing module comprises an idle time slot cluster conversion instructing sub-module, configured to instruct the base station to convert an MA occupied by a time slot occupying a share carrier frequency in an idle time slot cluster of the at least one cell to a share MA, and convert an MA occupied by a time slot occupying a non-share carrier frequency in the idle time slot cluster to a base MA, wherein the idle time slot cluster is a time slot cluster in which all time slots are not occupied by user equipment.

6. The upper control node of the base station according to claim 5, wherein the determining module is specifically configured to determine that a load of the at least one cell is greater than a second load threshold; or, determine that loads of all cells under the base station to which the at least one cell belongs are greater than a second load threshold; and the instructing module is specifically configured to instruct the base station to which the at least one cell belongs to convert, according to the time slot cluster, a share MA occupied by a time slot occupying a share carrier frequency in the at least one cell, and a base MA occupied by a time slot occupying a non-share carrier frequency in the at least one cell, wherein the converted share MA and the converted base MA constitute one MA.

7. The upper control node of the base station according to claim 6, wherein the instructing module further comprises:

a judging sub-module, configured to, after the base station performs the MA conversion successfully on the idle time slot cluster, determine whether a time slot cluster on which the MA conversion is not performed exists in time slot clusters of the at least one cell; and a deactivation instructing sub-module, configured to, after the judging sub-module determines that the time slot cluster on which the MA conversion is not performed does not exist in the time slot clusters of the at least one cell, instruct the base station to deactivate the share carrier frequency.

8. The upper control node of the base station according to claim 6, wherein the instructing module comprises:

an activation instructing sub-module, configured to instruct the base station to which the at least one cell belongs to activate, according to the time slot cluster, the share carrier frequency occupied by the time slot of the at least one cell;

a time slot cluster selecting sub-module, configured to select time slot clusters of a second predetermined number from time slot clusters of the at least one cell;

a switch instructing sub-module, configured to instruct a user equipment on the selected time slot clusters of the second predetermined number to be switched to an idle time slot of an unselected time slot cluster; and a conversion instructing sub-module, configured to instruct the base station to convert a share MA occupied by a time slot occupying a share carrier frequency in an idle time slot cluster of the selected time slot clusters of the second predetermined number, and convert a base MA occupied by a time slot occupying a non-share carrier frequency in the idle time slot cluster of the selected time slot clusters of the second predetermined number, wherein the converted share MA and the converted base MA constitute one MA.

* * * * *